United States Patent
Hakansson et al.

(10) Patent No.: US 9,372,662 B2
(45) Date of Patent: *Jun. 21, 2016

(54) PISTON FLUID METER WITH IMPROVED YOKE ARRANGEMENT

(75) Inventors: Marie Hakansson, Vargbogatan (SE); Bengt Ingemar Larsson, Skivarp (SE)

(73) Assignee: Wayne Fueling Systems Sweden AB, Malmo (SE)

(*) Notice: Subject to any disclaimer, the term of this patent is extended or adjusted under 35 U.S.C. 154(b) by 365 days.

This patent is subject to a terminal disclaimer.

(21) Appl. No.: 13/976,762

(22) PCT Filed: Dec. 28, 2010

(86) PCT No.: PCT/EP2010/070813
§ 371 (c)(1),
(2), (4) Date: Jun. 27, 2013

(87) PCT Pub. No.: WO2012/089245
PCT Pub. Date: Jul. 5, 2012

(65) Prior Publication Data
US 2013/0276528 A1  Oct. 24, 2013

(51) Int. Cl.
*G01F 7/00* (2006.01)
*G06F 3/16* (2006.01)
(Continued)

(52) U.S. Cl.
CPC .. *G06F 3/16* (2013.01); *B67D 7/18* (2013.01); *G01F 3/18* (2013.01)

(58) Field of Classification Search
CPC ............... G01F 1/74; G01F 3/12; G01F 1/00; G01F 3/18; B67D 7/166
USPC ........... 73/195, 272 R, 861, 247, 248; 48/180
See application file for complete search history.

(56) References Cited

U.S. PATENT DOCUMENTS 2,756,726 A * 7/1956 Ainsworth ........................ 91/180
5,094,106 A * 3/1992 Dedisse et al. .................. 73/247

(Continued)

FOREIGN PATENT DOCUMENTS

GB 1356762 6/1974
WO WO98/49530 11/1998

OTHER PUBLICATIONS

PCT, International Search Report, International Application No. PCT/EP2010/070813; International filing Date: Dec. 28, 2010, 3 pages.

(Continued)

*Primary Examiner* — Lisa Caputo
*Assistant Examiner* — Nigel Plumb
(74) *Attorney, Agent, or Firm* — Mintz Levin Cohn Ferris Glovsky and Popeo, P.C.

(57) ABSTRACT

A fluid meter (27) comprising a housing (28) defining at least one crankcase (29) and two cylinders (25, 26), a crankshaft (11) disposed in the crankcase (29), two pistons (3, 4) respectively mounted in the cylinders (25, 26) for reciprocal movement, a first connecting rod (12) connected to one of the pistons (3) and to the crankshaft (11) for rotating the crankshaft (11) in response to the movement of the one piston (3), and a second connecting rod (13) connected to the other piston (4) and to the crankshaft (11) for rotating the crankshaft (11) in response to the movement of the other piston (4), wherein the first and second connecting rods (12, 13) have yoke slots (16, 17) with a circumferential periphery (62) for receiving a crank pin (19) radially offset from the crankshaft (11). The fluid meter (27) is characterized in that the circumferential periphery (62) of each one of said yoke slots (16, 17) has at least one resilient portion (61) for allowing a play? between said crank pin (19) and said circumferential periphery (62) of said yoke slot (16, 17) at said at least one resilient portion (61). The invention further relates to a multiple fluid meter assembly (61) comprising at least two fluid meters (27) as defined above, and to a fuel dispensing unit comprising a fluid meter (27) or a multiple fluid meter (61) as defined above.

15 Claims, 8 Drawing Sheets

(51) Int. Cl.
*B67D 7/18* (2010.01)
*G01F 3/18* (2006.01)

(56) References Cited

U.S. PATENT DOCUMENTS 5,648,606 A * 7/1997 Spalding .................. 73/247
5,686,663 A * 11/1997 Spalding .................. 73/247
5,811,676 A * 9/1998 Spalding et al. ................. 73/247
6,840,151 B1 * 1/2005 Barker et al. ................... 91/485

OTHER PUBLICATIONS

Unofficial English translation of CN Office Action issued Mar. 20, 2014 in connection with corresponding CN Patent Application No. 201080071008.7.

* cited by examiner

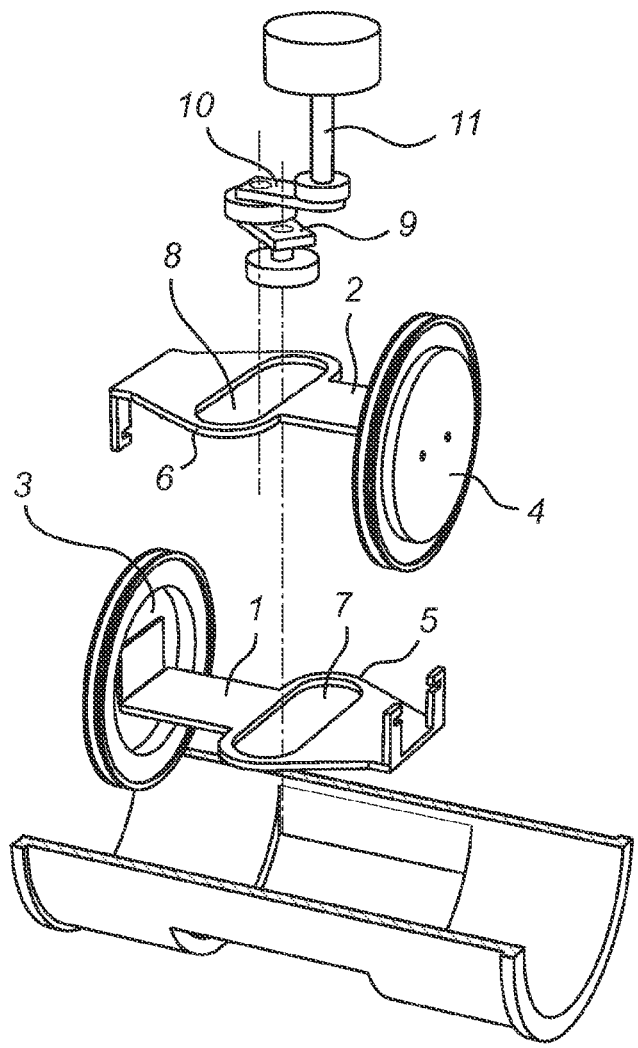
(Prior art) *Fig. 1a*
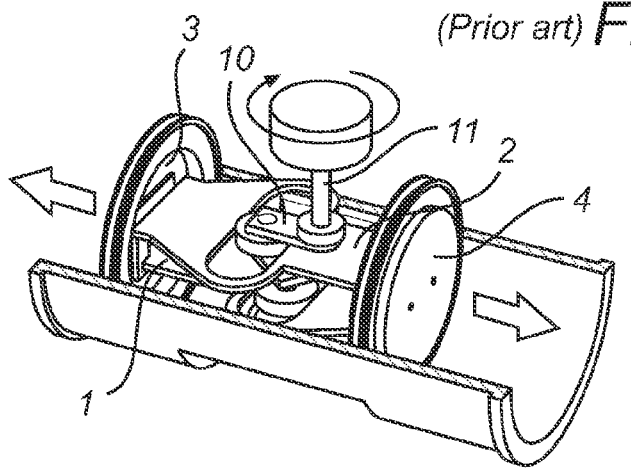
(Prior art) *Fig. 1b*

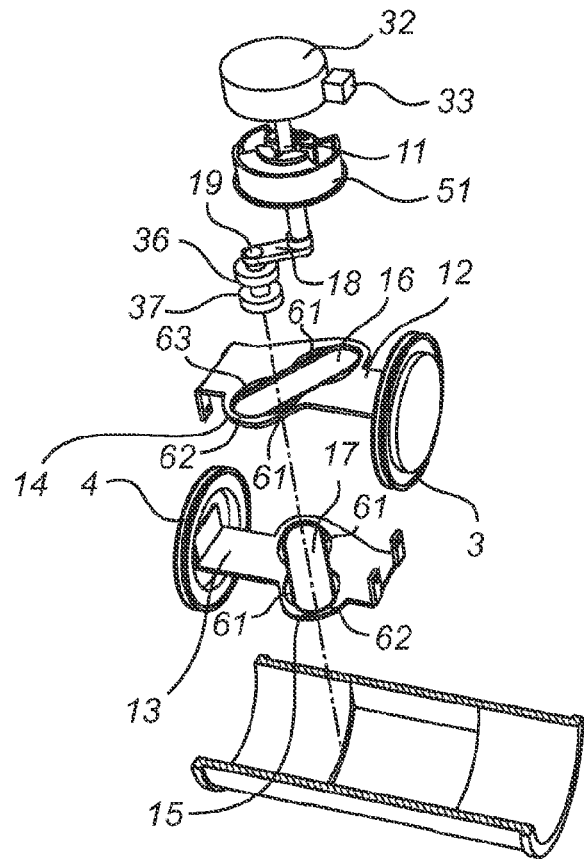
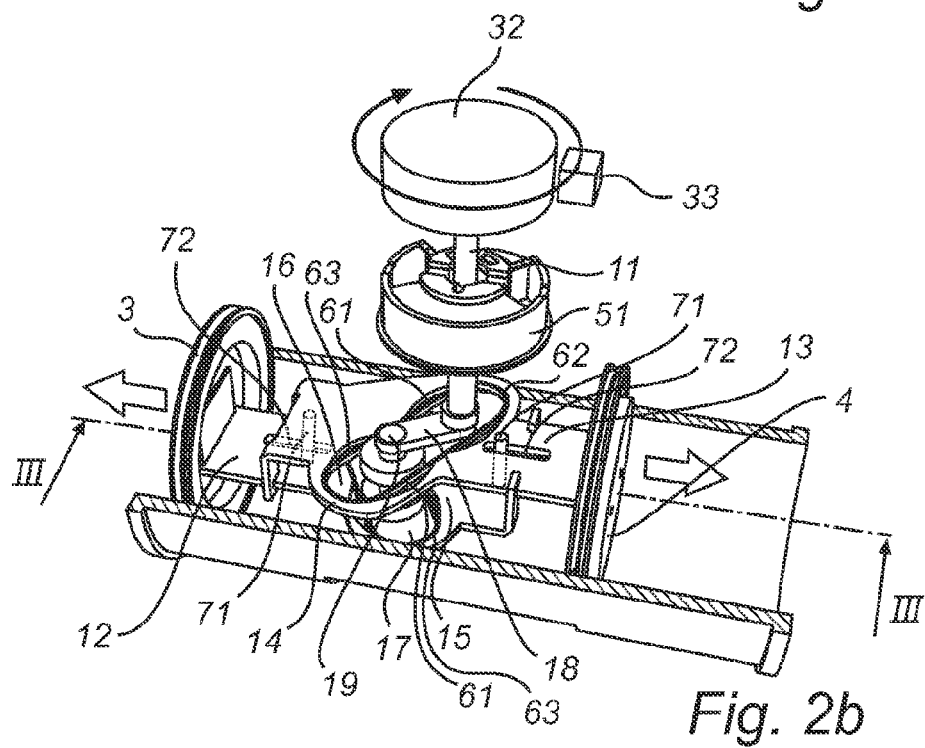
Fig. 2a
Fig. 2b

PISTON FLUID METER WITH IMPROVED YOKE ARRANGEMENT

CROSS-REFERENCE TO RELATED APPLICATION

This application is a national stage application pursuant to 35 U.S.C. §371 of PCT Application No. PCT/EP2010/070813, filed Dec. 28, 2010, and entitled "Piston Fluid Meter With Improved Yoke Arrangement," the entire contents of which is herein incorporated by reference.

TECHNICAL FIELD

The present invention relates generally to a fluid meter for volume measurement of a flowing fluid. More particularly, the present invention relates to a fluid meter as defined in the introductory part of claim 1, a multiple fluid meter assembly as defined in claim 12, and a fuel dispensing unit as defined in claim 15.

BACKGROUND ART

Fluid meters are widely used for most kinds of fluids in different application areas. Fluid meters are for example used in fuel dispensing pumps for retail sale of motor fuel, providing a means for measuring the quantity dispensed from the pump. The measured volume is typically communicated to a register, displaying the dispensed volume and the price.

A fluid meter commonly used for fuel dispensers is shown by Ainsworth, U.S. Pat. No. 2,756,726. In this disclosure a meter having a multiple piston hydraulic motor is used. Fluid is allowed to enter cylinders and cause reciprocation of the pistons. The pistons are connected to a shaft that will rotate as an effect of the reciprocation. A rotary valve, coupled to the shaft, admits liquid to the cylinders or permits flow to the outlet connections, in proper timed relation. The fluid meter utilizes what may be termed "hypothetical" cylinders, mechanically and hydraulically cooperating with the cylinders and pistons which are structurally existent.

This is accomplished by arranging the ports and the rotary valve so as to sequentially admit fluid to both the crankcase and the ends of the cylinders at the same time as fluid is withdrawn from the cylinders. The fluid volume admitted to, or withdrawn from, the crankcase is the algebraic sum of the volume withdrawn from, or admitted to, the cylinders. Two pistons, actuated through the valve mechanism, advantageously 120 degrees out of phase, thus perform the work equivalent of three pistons. This reduces the actual number of cylinders required for a given capacity, reduces internal friction and pulsation, and achieves smoother operation. The two pistons are attached via connecting rods to a crankshaft with a radially offset crank pin. The crank pin engages a yoke in each connecting rod so that the reciprocating movement of the two pistons is transformed into a rotary motion of the crankcase in accordance with the Scotch Yoke type principle. To accomplish the phase differences between the pistons, the two physical cylinders are oriented with an angle of 120 degrees between their respective centre axis.

The Ainsworth fluid meter has several drawbacks, as e.g. the requirement of special piston guide barrels, the arrangement of cylinders and guide barrels is difficult to mould or cast and machine, and the register is driven by a shaft extending through the meter housing with accompanying risk of leakage.

A similar fluid meter is disclosed by Spalding, U.S. Pat. No. 5,686,663 and WO 98/49530. This fluid meter aims at eliminating the drawbacks of the Ainsworth fluid meter. Thus, the two angled cylinders of Ainsworth are aligned along a common centre axis to eliminate the bulky construction of Ainsworth. To accomplish the same piston reciprocity, the crankshaft is modified with an extra crank arm. The in-line construction is advantageous when several meters have to be mounted in one dispenser, which is the normal case in most modern fuel dispensers.

The Spalding fluid meter, however, is not without some drawbacks. As the fluid meter is used, wear will affect the parts within the fluid meter. The wear on the parts of the fluid meter may lead to a fluctuation in stroke length, which possible over time will result in an error in the volume readings of fluid meter.

SUMMARY OF THE INVENTION

It is an object of the present invention to improve the current state of the art, to solve the above problems, and to provide an improved fluid meter that is easier to manufacture, more robust, more reliable, and more precise than previous piston fluid meters.

According to one aspect, the present invention provides a fluid meter comprising a housing defining at least one crankcase and at least two cylinders, a crankshaft disposed in the crankcase, at least two pistons respectively mounted in the cylinders for reciprocal movement, a first connecting rod connected to one of the pistons and to the crankshaft for rotating the crankshaft in response to the movement of the one piston, and a second connecting rod connected to the other piston and to the crankshaft for rotating the crankshaft in response to the movement of the other piston, wherein the first and second connecting rods have yoke slots with a circumferential periphery for receiving a crank pin radially offset from the crankshaft. The invention is characterised in that the circumferential periphery of each one of said yoke slots has at least one resilient portion. The resilient portion is configured to allow a play between the crank pin and the circumferential periphery of the yoke slot at the at least one resilient portion.

During use of the fluid meter, the crank pin moves within the yoke slot in accordance with the movement of the piston mounted in the cylinder, which piston may have a mechanical stop in the cylinder. The fluid meter is configured such that when it is new, the crankpin will flex into the resilient portion when the piston meets its mechanical stop in the cylinder, i.e. when the piston is in its end position of the cylinder. In time, the flex of the crank pin into the resilient portion will decrease due to wear of the parts such as the bearings in the fluid meter. When the fluid meter has been used for a certain amount of time, the flex of the crankpin into the resilient portion will be insignificant. However, due to this configuration, even though parts have been worn and conditions of the fluid meter have changed, the stroke length of the piston will remain the same. Accordingly, a more reliable and precise fluid meter has been created.

The at least one resilient portion may comprise a recess in the circumference periphery of the yoke slot, wherein the recess is covered by a stripe which extends along at least a part of the circumference periphery of the yoke slot. Accordingly, a flex into the recess is possible if necessary. However, when no flex is necessary, the strip will cover the recess and the yoke slot is conventional.

The stripe may be made of metal, having appropriate resilient properties as discussed above. The metal may be spring metal, having very high yield strength, allowing the spring steel to return to the original shape of the yoke slot despite significant bending by the crank pin e.g. during temporarily elevated pressure in the cylinder. The metal stripe may be a steel band made of e.g. spring steel, but the stripe could also have a profile shape, e.g. a U-shape covering the edge of the yoke slot that is facing the crank pin.

Each one of the yoke slots may have two resilient portions. In one embodiment each one of the yoke slots may have at least three resilient portions, preferably four resilient portions. The resilient portion(s) may be provided at at least one position where the crank pin is located within the yoke slot when its corresponding piston(s) is in a turning point for any of the cylinders or the crank case.

The resilient portions provide the possibility to manufacture the connecting rods so that the piston meter is in an over strung state at its turnings points, i.e. the crank pins are pressed into the resilient portions at the turning points of the pistons. This is achieved by a stopping member that stops the piston slightly before it should be stopped according to the crank arm length. In each cylinder end wall and in the position between the cylinders and the crank case, a stop is placed to define the end of the stroke length of the cylinders. In the prior art such stops have been very carefully adjusted to provide the correct volume without any slack in the mechanics, to be sure to provide the correct stroke length and thus the correct measurement volume. In an over strung system according to the present invention, the crank pin will move slightly into the resilient part of the yoke slot. The positioning of the stop will then not need the adjustment calibration as in the prior art, leading to reduced manufacturing costs. As wear of components creates fluctuations in stroke length, the turning point will remain the same since the system is over strung. The amount of pressure on the resilient parts will instead decrease as wear affects the crank mechanism.

According to one embodiment of the present invention at least one of the connecting rods has a stopping member engaging the other connecting rod when the pistons are in a turning point for the crank case, i.e. for the crank case volume being the third "hypothetical" cylinder. The stop may be arranged to restrain the two pistons from separating further away than the turning point for the crank case where the volume is at a maximum. The stop may also be arranged to restrain the pistons from approaching further towards each other than the turning point for the crank case where the volume is at a minimum.

The use of stops defining how far apart and near each other the pistons can move, as described above, can be used to make also the third "hypothetical" cylinder over strung so that also the crank case cylinder has the advantage of not being affected in its stroke length and thus its volume due to wear of other components in the fluid meter.

As discussed above, wear on the yoke slot inner edge may also occur when the cylinders, including the third hypothetical cylinder of the crank case, are at their turning points if a sudden excessive pressure arises in the cylinder. Pressure peaks could, both under pressure and over pressure occur at operation of a fuel dispenser unit, in which the fluid meter is mounted, when the flow of the dispensing unit is suddenly stopped. In fuel dispensing units, this occurs each time the fuel handle nozzle is released and fuel dispensing is stopped. Extra wear, inducing clearance between the crank pin and the yoke slot, is extra damaging to the fluid meter in the turning point of the cylinders, including the third hypothetical cylinder of the crank case, since exact definition of the turning point is a criteria for an exact measurement of the fluid volume that is filled in the cylinder and is to be measured.

The connecting rods may be connected to the crankshaft by one common crank pin that is radially offset from the crankshaft; that an axis through the endpoints of the yoke slot of one connecting rod forms an angle alpha with the alignment axis of the two cylinders; and that an axis through the endpoints of the yoke slot of the other connecting rod forms another, different angle beta with said alignment axis, so that the corresponding pistons reciprocate out of phase.

Using yoke slots that extend along a straight line between the endpoints of the yoke slot is the easiest way to generate piston movement with a motion speed following a harmonic sinus shape. It should however be noted that other shapes of the yoke slots could be used, e.g. where the yoke is bent along a suitable curve. The design of the inlet/outlet valve of the fluid meter casing could e.g. require a special reciprocating piston movement, invoked by the yoke slots, to match its design.

The settings of the yoke slots are arranged so as to cause the pistons to reciprocate out of phase even though the cylinders are aligned along the same centre axis. Using normal transversal yoke slots, such as in the Spalding patent described above, two crank arms are necessary to achieve piston movements that are out of phase in such geometry. Using the yoke slots according to the invention only one crank arm is necessary. There are several benefits of using only one crank arm for the movement of the pistons. The number of components is reduced, leading to reduced material costs. The manufacturing procedure is simplified leading to cheaper production costs. One single crank arm instead of two leads to a crankshaft assembly that is a more robust and rigid unit. Further, the problem of providing the correct angle between two crank arms is eliminated as there is only one crank arm.

Each one of the yoke slots of said two connecting rods may be adapted to extend along a straight line between said endpoints. As mentioned above, this is the easiest way to generate piston movement with a motion speed following a harmonic sinus shape and is therefore preferred at present.

The angles alpha and beta may be chosen so that the pistons reciprocate approximately 60° out of phase.

It is advantageous that the yokes reciprocate approximately 60° out of phase to achieve a smooth operation of the fluid meter. To be able to construct the housing in a simple and fairly symmetric manner, a phasing of the pistons 60° out of phase together with a proper inlet/outlet valve design and a geometry where the cylinders are directed from each other, i.e. 180° angled from one another, will allow the fluid flow to enter and exit the two cylinders and the "hypothetical" cylinder in the crankcase, i.e. in between the reciprocating pistons, one by one in a smooth motion with a phase offset by 120° between the operation of the cylinders.

The angle alpha of the yoke slots of the fluid meter may be less than 90° and the angle beta is more than 90°. Alpha may be approximately 60° and beta may be approximately 120°. The latter angle setting will cause the pistons to reciprocate 60° out of phase and the operation of the cylinders will thus be 120° out of phase as preferred due to the 180° angle between the two physically existing cylinders.

Another advantage of using oblique settings of the yoke slots, preferably with angles as described above, is that manufacturing of the fluid meter is simplified. Not only will the crank shaft be simpler, having only one crank arm and one crank pin, but the setting of the angles creating the out-of-phase piston movements will be made in the manufacturing process of the yoke slots instead of in the mounting of two crank arms on the crank shaft as in the prior art of Spalding. Accurate and precise formation of the yoke slots is fairly simple to achieve. The yokes and slots can be manufactured by moulding, punching a metal sheet, cutting etc. All of these methods are simple and they do not differ from the way other yokes are manufactured. This means that the manufacturing changes in the production of the yokes that are invoked by the present invention will be very small.

When having shafts that have angled yoke slots as described above, the resilient portions still have to be placed at the position in the yoke slots where the crank pins are located at the turning point of the yoke slots. The positions of the resilient portions in the yoke slots for the two cylinders will be placed slightly away from the end of the yoke slots. The positions for the two resilient portions for each of the yoke slots, in relation to the third hypothetical cylinder of the crank case, are also here placed at the end of the yoke slots in the direction of the movement of the piston just before the turning point in question.

It should, however, be noted that also for the angled yoke slots additional resilient portions may be placed in the other direction of the piston to ensure that the yoke is not harmed from neither over pressure, nor under pressure in the turning points of each cylinder.

A portion of one connecting rod may engage the other connecting rod to support and guide the other connecting rod during movement. This can e.g. be achieved through each connecting rod having a pair of guide tabs engaging the opposed side edge portions of the other connecting rod. The guide tabs could further have notches for respectively receiving the opposed side edge portions.

To guide the connecting rods in the manner described, has the advantage of ensuring that the rods move in parallel to each other without deviation from the centre axis of the cylinder. It is further not necessary to have yokes that extend in the full width of the cylinder, when guiding the connecting rods in one another. Such yokes with reduced width lead to reduction or avoidance of friction to the cylinder walls, which is advantageous not only for simplifying the operation of the connecting rods and their respective yokes, but also to reduce damages to the cylinder walls. If the walls are scratched or damaged in any way by the yokes, the piston ring gaskets will eventually not be able to seal the cylinders from the crank case as needed.

A fluid meter of the above type may be provided where ports are defined in the housing in communication with the cylinders and the crankcase, and further comprising a port valve mounted on the crankshaft for rotation therewith and having a plurality of ports for sequentially registering with the ports in the housing for distributing fluid into and from the cylinders and the crankcase to control the movement of the pistons. The port valve as described above will ensure precise volume flow through the cylinders of the fluid meter.

The fluid meter may comprise at least one wheel coupled to the crankshaft and has at least one magnetic pole, and at least one sensor to detect the influence of the at least one magnetic pole and to generate a signal corresponding to the flow of the fluid into and from the corresponding cylinders and the crankcase.

According to another aspect the present invention provides a multiple fluid meter assembly comprising at least two fluid meters of the above type. Such an assembly will provide a compact design when multiple fluid meters are required.

The at least two fluid meters may be arranged such that their alignment axes are parallel. An assembly with parallel fluid meters will provide a meter assembly that is very compact. This is often an important criterion in modern fluid dispensers, where many fluid meters are required and the fluid dispenser unit design require the internal equipment to be small.

The fluid inlet and the fluid outlet of one fluid meter may communicate with the fluid inlet and the fluid outlet of another fluid meter, respectively, so as to connect the individual fluid meters in parallel.

According to yet another aspect the present invention provides a fuel dispensing unit for refuelling vehicles, comprising a fluid meter or a multiple fluid meter assembly of the types described above. The fluid meter or fluid meter assembly according to the present invention is especially suitable for fuel dispensers due to its reliability and accurate measurement capabilities.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein:

FIG. 1a is an exploded diagram of connecting rods having slotted yokes and a crank shaft having two crank arms of a fluid meter according to prior art.

FIG. 1b is a perspective view of a mounted assembly of the prior art of FIG. 1a.

FIG. 2a is an exploded diagram of connecting rods having angled yoke slots with resilient parts, a crankshaft having one crank arm, a rotating valve, a magnetic wheel and a transducer according a preferred embodiment of a fluid meter according to the present invention.

FIG. 2b is a perspective view of a mounted assembly of FIG. 2a.

FIG. 3b is a perspective view of a mounted assembly of FIG. 3a.

DETAILED DESCRIPTION OF PREFERRED EMBODIMENTS OF THE INVENTION

Figure 2C:
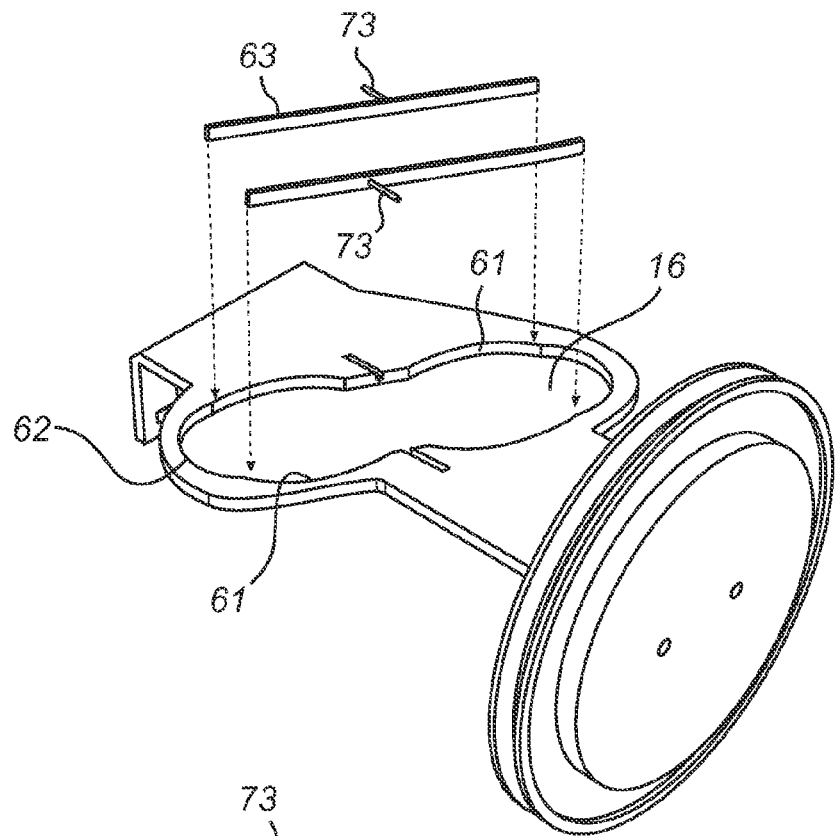
FIG. 2c is a perspective view of an enlarged yoke slot according of FIGS. 2a and 2b.

FIGS. 1a and 1b shows a pair of connecting rods, 1, 2, according to the prior art (U.S. Pat. No. 5,686,663 to Spalding et al), each connected to a piston, 3, 4, as described in the prior art. The connecting rods, 1, 2, have Scotch yoke portions, 5, 6, with oblong yoke slots, 7, 8. The centre axes of the yoke slots are perpendicular to the centre axes of the connecting rods, 1, 2. To move the connecting rods, 1, 2, and thus also the pistons, 3, 4, with a phase difference of 60°, as described in the prior art of Spalding, the yoke portions, 5, 6, will have to be driven by different crank arms, 9, 10, of the crankshaft, 11 as depicted in FIGS. 1a and 1b.

FIGS. 2a and 2b shows the connecting rods 12, 13 of a preferred embodiment of the present invention, the connecting rods 12, 13, having yoke portions 14, 15, with yoke slots 16, 17. To perform a reciprocating movement of the pistons 3, 4, using only one crank arm, 18, the centre axes of the oblong yokes slots 16, 17, are each angled 30° compared to the perpendicular direction to the centre axes of the connecting rods 1, 2. The combined angle between the centre axes of the oblong yoke slots of the two connecting rods 12, 13, is thus 60°. This arrangement of the yoke slots will invoke the same movement of the connecting rods 12, 13, and thus also the pistons 3, 4, as the prior art, i.e. a reciprocating movement of the pistons 60° out of phase, but with the use of only one crank arm 18, and one crank pin, 19.

The resilient portions 61 of the circumferential periphery 62 of the yoke slot 16, 17 are placed at the positions where the crank pin 19 is located at the turning point of the cylinders, including the crank house cylinder. In the FIGS. 2a and 2b, the resilient portions 61 are located so that they will move further than the turning point and use the resilient feature in the turning point, i.e. the fluid meter is over strung. The resilient portions 61 are made from a recess 61 in the periphery 62 of each yoke slot covered by a metal stripe 63 covering the entire periphery of the yoke slot. It should be noted that additional resilient portions 61 could be placed in the other direction of the piston 3, 4 to protect the yoke slot 16, 17 from pressure transients in the cylinder volumes.

In FIG. 2b, stop members 71, 72 in the form of pins 71 are provided in each connecting rod 12, 13, which pins protrude into a slot 72 in the other connecting rod 13, 12 respectively. These stop members 71, 72 are provided to facilitate maximum and minimum stop positions for the crank case volume 42. When the pistons 3, 4 reach the turning point where the crank case volume 42 is at a maximum, the stop pins 71 will abut against the end of the slot 72 nearest the crank pin 11. When the pistons 3, 4 reach the turning point where the crank case volume 42 is at a minimum, the stop pins 71 will abut against the end of the slot 72 nearest the pistons 3, 4.

Figure 2D:
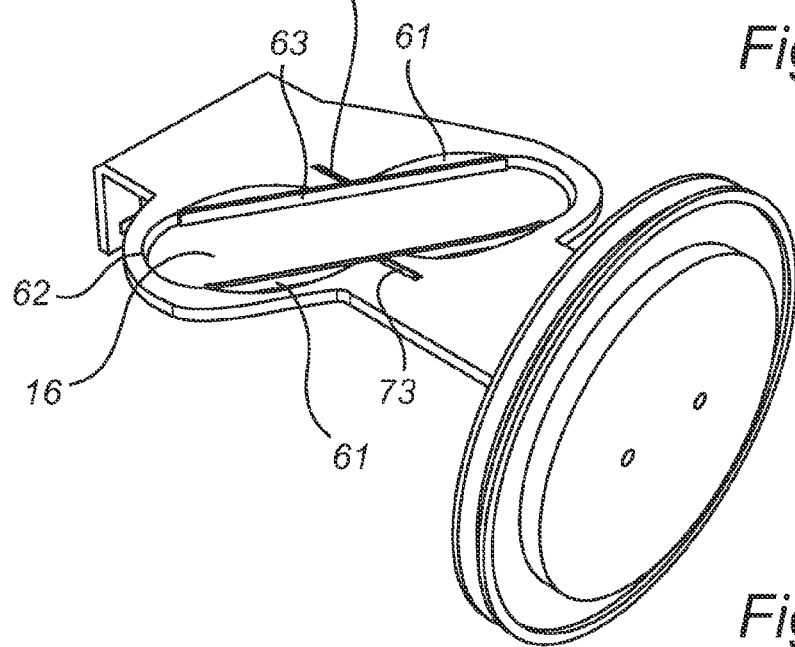
FIG. 2d is a perspective view of an enlarged yoke slot according of FIGS. 2a and 2b.

FIGS. 2c and 2d show an enlarged yoke slot 16 as disclosed in FIGS. 2a and 2b. The yoke slot 16 has two resilient portions 61. The positions of the resilient portions 61 in the yoke slots 16 are all visible in this FIG. The resilient portions 61 each comprises a recess in the circumference periphery 62 of the yoke slot 16. The recesses are covered by a stripe 63 which extends along the long sides of the circumference periphery 62 of the yoke slot 16. The stripe parts 63 are made of metal and fastened in the yoke slot by fastening means 73. Naturally, the strip 63 may be made of any suitable material and the number of resilient portions 61 may be altered if necessary. That is to say, the number of resilient portions 61 of each yoke slot 16 may for example be anything from 2 up to 8.

Figure 3A:
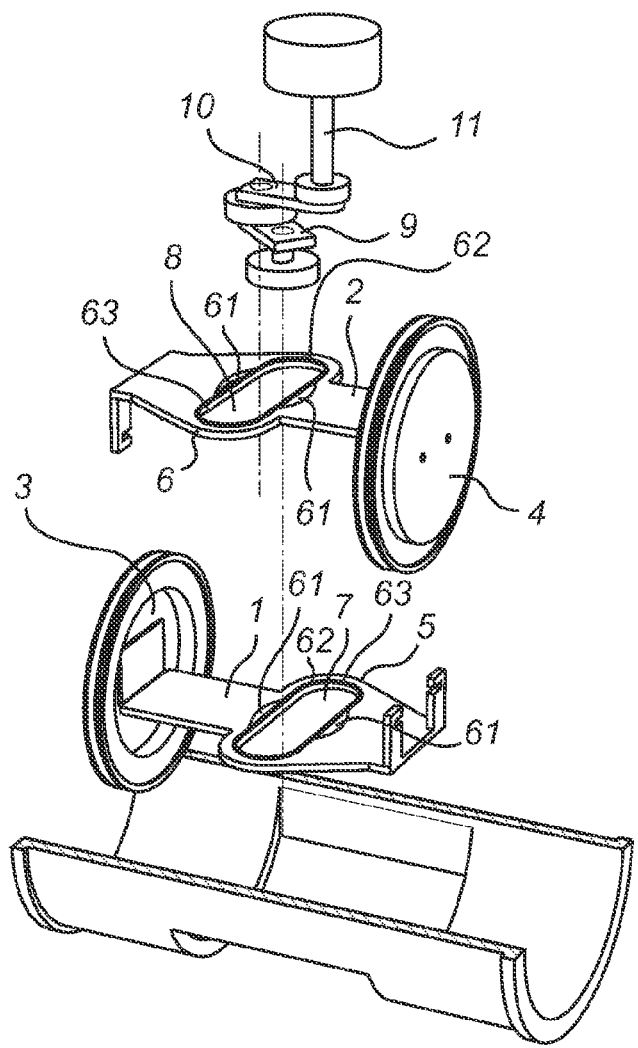
FIG. 3a is an exploded diagram of connecting rods having straight yoke slots with resilient parts, a crankshaft having two crank arms, a rotating valve, a magnetic wheel and a transducer according a preferred embodiment of a fluid meter according to the present invention.
Figure 3B:
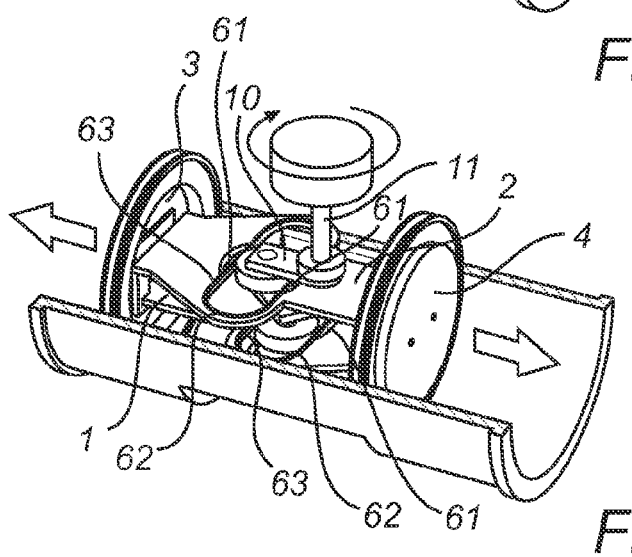

FIGS. 3a and 3b shows a fluid meter having straight yoke slots 7, 8 as in FIGS. 1a and 1b. The resilient portions 61 according to the present invention will in the case of such a solution be placed slightly different than when having straight yoke slots 7, 8 compared to the angled ones of FIGS. 2a and 2b, since the turning crank pins will have different positions at the turning positions of the two cylinders and the crank case for this yoke slot solution. The turning point for the crank case volume 42 will be at the very end of the yoke slots, and it is understood that resilient portions could be placed also there to provide an over strung system also for the crank case volume 42.

Figure 3C:
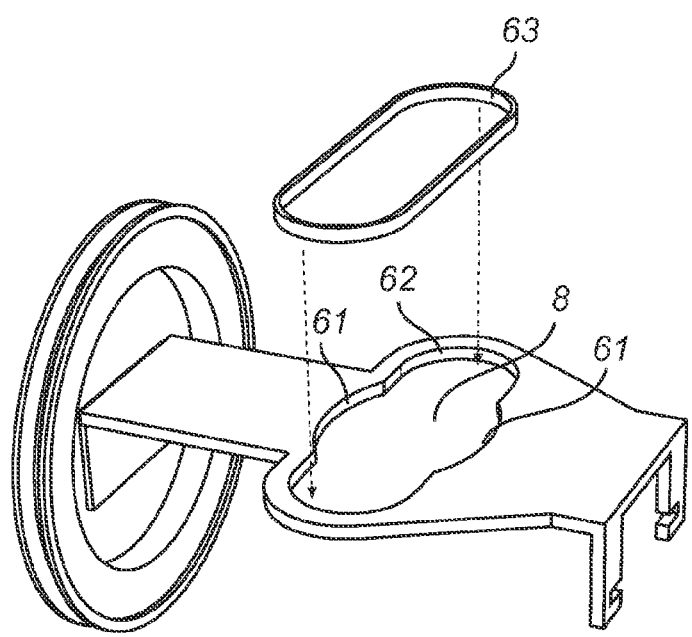
FIG. 3c is a perspective view of an enlarged yoke slot according of FIGS. 3a and 3b.
Figure 3D:
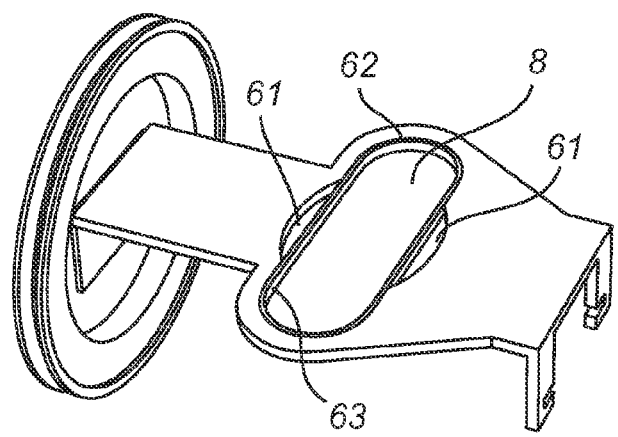
FIG. 3d is a perspective view of an enlarged yoke slot according of FIGS. 3a and 3b.

FIGS. 3c and 3d show an enlarged yoke slot 8 as disclosed in FIGS. 3a and 3b. The yoke slot 8 has two resilient portions 61. The positions of the resilient portions 61 in the yoke slots 8 are all visible in this FIG. The resilient portions 61 each comprises a recess in the circumference periphery 62 of the yoke slot 8. The recesses are covered by a stripe 63 which extends along the circumference periphery 62 of the yoke slot 8. The stripe 63 is made of metal. Naturally, the strip 63 may be made of any suitable material and the number of resilient portions 61 may be altered if necessary. That is to say, the number of resilient portions 61 of each yoke slot 8 may for example be anything from 2 up to 8.

FIGS. 2a, 2b, 3a, 3b show a preferred embodiment of the connecting rods, 12, 13, of the present invention. A portion 20 of one connecting rod, 12, engages the other connecting rod, 13, to support and guide the other connecting rod, 13 during movement. Each connecting rod, 12, 13, further has a pair of guide tabs, 21, 22, engaging the opposed side edge portions, 23, 24, of the other connecting rod, 12, 13. Notches are further formed in the guide tabs, 21, 22, respectively for receiving the opposed side edge portions, 23, 24. By coupling the connecting rods, 12, 13, the connecting rods, 12, 13, are limited to a movement along the centre axis of the aligned cylinders, 25, 26. It should, however, be noted that the effect of the connection of the connecting rods, 12, 13, limiting the movement of the connecting rods, 12, 13, could be made in a number of different ways. The rods could e.g. be guided by guiding rails mounted to the cylinder walls, limiting the movement reciprocating along the cylinder centre axes. The same effect could also be achieved by using connecting rods, 12, 13, having any other coupling means to each other or to the cylinders, 25, 26 to limit their movement as described.

The connecting rods, 12, 13, of FIGS. 2a, 2b, 3a and 3b are in this embodiment formed from metal sheet with yoke portions, 23, 24, which are punched to provide first and second slotted yokes, 25, 26. The connecting rods, 12, 13, could, however be made from any other suitable material.

Figure 4:
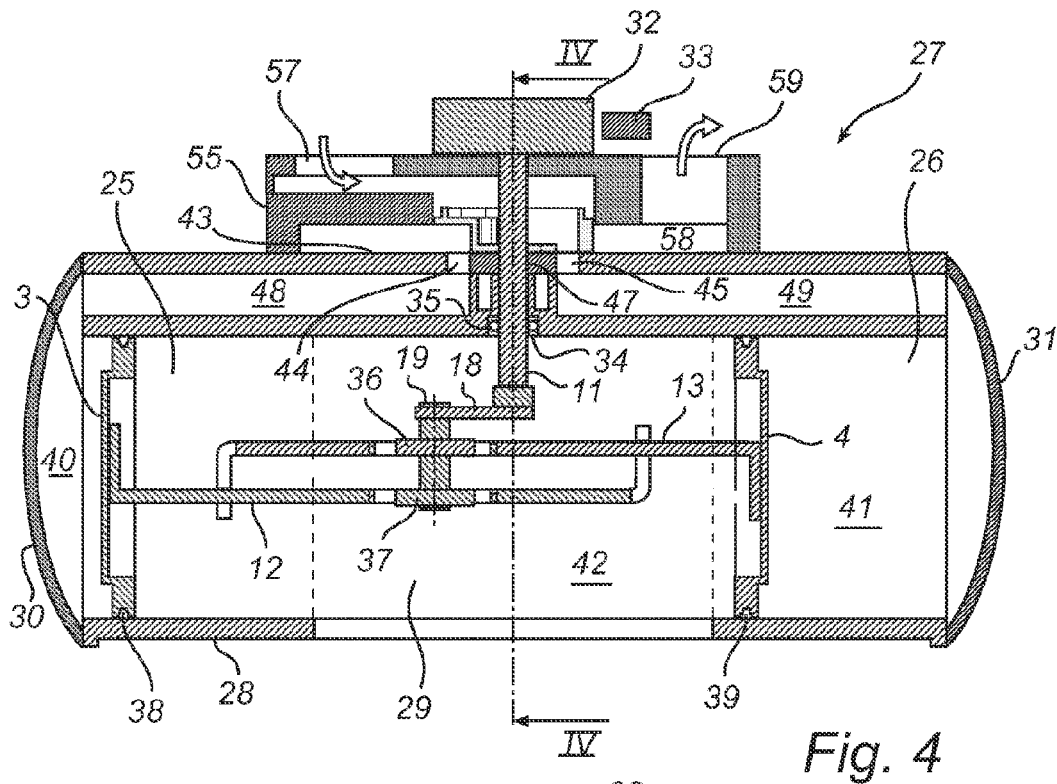
FIG. 4 is a cross sectional view of the fluid meter according to the invention taken along the axis of the aligned cylinders, corresponding to the line Ill of FIGS. 2b and 3b.

In FIG. 4 the reference numeral 27 designates a flow meter according to the present invention. The flow meter 27 includes a flow meter body 28 having a crankcase portion 29 (indicated by the broken lines) and opposing, axially aligned, first and second cylinder portions, 25 and 26, respectively, extending outwardly from the crankcase (from the broken lines). The head ends of the cylinder portions 25 and 26 are capped by first and second head end cover plates 30 and 31, respectively.

A magnetic wheel 32 is connected to the crankshaft 11 at the centre of the magnetic wheel 32. A series of magnetic poles (not shown) are incorporated in the magnetic wheel 32 angularly spaced about the outer circumference of the wheel 32.

A Hall Effect transducer 33 having two sensors, well known in the art, is mounted within close proximity to the magnetic wheel 32. Due to the proximity of the sensors to the wheel 32, the sensors can detect fluctuations in the magnetic influence of the magnetic poles of the wheel 32 when the wheel 32 rotates. In response to such detection, the transducer 33 generates a pulsed signal proportional to the rate of rotation of the wheel 32. The two sensors are, furthermore, horizontally spaced so that the direction of rotation of the magnetic wheel 32 can be determined by identifying which of the two sensors first detects the magnetic influence of a particular pole.

A ball bearing assembly 34 is fitted in a small bore 35 in the meter body 28. A crankshaft 11 is rotatably disposed in the bearing assembly 34. The crankshaft 11 has a vertical orientation bearing laterally against the bearing assembly 34. The upper portion of the crank shaft 11 extends above the bearing assembly 34 and is shaped to receive a rotary valve more thoroughly discussed with reference to FIGS. 6 and 7 below. A crank arm 18 is connected to the lower portion of the crankshaft 11 and extends radially outwardly from the crankshaft. A crankpin 19 extends downwardly from the radially outer part of the crank arm 18 through a first roller bearing 36 and a second roller bearing 37, the second roller bearing 37 being located below the first roller bearing 36.

Referring to FIG. 4, the flow meter 27 further includes first and second pistons 3, 4, disposed in the cylinders 25 and 26, respectively. First and second connecting rods, 12, 13, drivingly connect the respective pistons 19, 20, to the respective first and second roller bearings, 36, 37. The connecting rods 12, 13 are hence connected to the crankshaft via the roller bearings, 36, 37. The connecting rods 12, 13 are more clearly shown in FIGS. 2a and 2b. The first and second connecting rods, 12, 13 are in this particular embodiment formed from metal sheet with yokes portions, 14, 15, which are punched to provide first and second oblong slotted yokes, 16, 17 for slidingly engaging the respective first and second roller bearings, 36, 37. The oblong slotted yokes, 16, 17 do in this embodiment have straight central axes with an angle of 60° between the respective centre axis. The first and second slotted yokes 16, 17, have centre axes with angles of 120° and 60°, respectively, to the centre axis of the axially aligned first and second cylinder portions 25 and 26.

Referring to FIG. 4, the pistons 3, 4, have circular recesses, 38, 39, for receiving gaskets (not shown). The gaskets are made of a resilient material to seal the cylinder head chambers 40 and 41 from the crankcase chamber 42 defined by the crankcase portion 29 and the parts of the cylinder portions 25, 26 that are on the inner sides (facing the crankcase) of the pistons 3 and 4. The two pistons 3, 4, thus divides the cylinder volumes combined with the crank case portion volume in three chambers, sealed from each other, the head chambers 40, 41 and the crankcase chamber 42.

Figure 5:
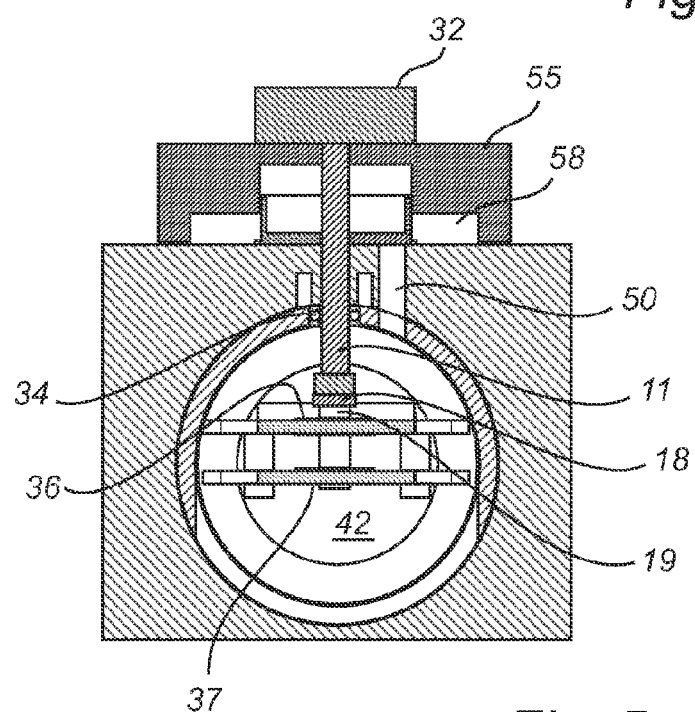
FIG. 5 is a cross sectional view along the line IV in FIG. 4 of the fluid meter according to the invention.
Figure 7:
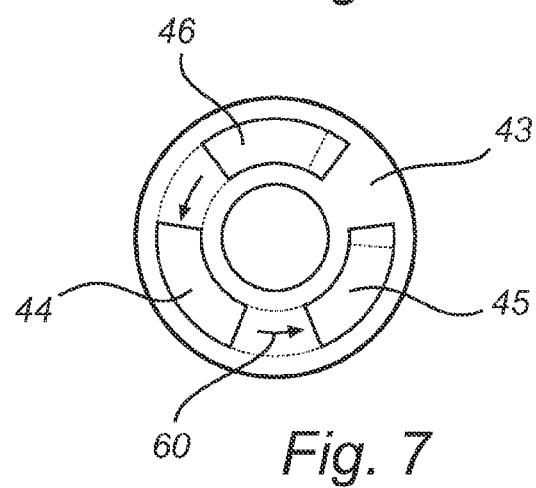
FIG. 7 is a plan view showing the ports of a rotary valve superimposed over a valve seat of the fluid meter in FIG. 4.

FIG. 7 shows the valve seat 43 as seen from the top of the flow meter 27 of FIG. 4. The valve seat 43 includes first, second and third arcuate ports, 44, 45, 46, which each cover an arc about the crankshaft bore 47 of approximately 80° and are angularly spaced apart approximately 40° between ports. Referring to both FIGS. 4 and 7 the first port 44 is in fluid communication with the first head end chamber 40 via a first passageway 48 formed in the fluid meter body 28. The second port 45 is in fluid communication with the second head end chamber 41 via a second passageway 49 formed in the fluid meter body 28. Referring to FIGS. 7 and 5, the third port 46 is in fluid communication with the crankcase chamber 42 via a third passageway 50 formed in the fluid meter body 28.

Figure 6A:
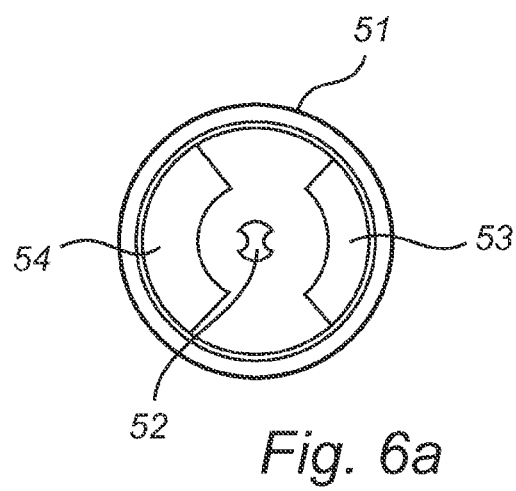
FIG. 6a is a top view of the rotary valve of the fluid meter.
Figure 6B:
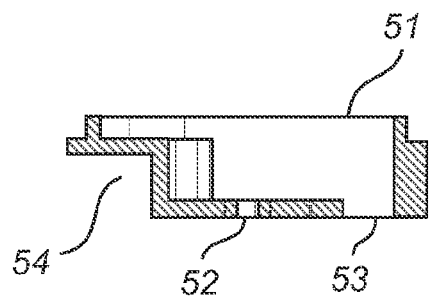
FIG. 6b is a cross sectional view of the rotary valve of the fluid meter according to the invention.

Referring to FIG. 6a, a rotary valve 51 is positioned on top of the valve seat 43 to control the admission and discharge of a fluid into and out of the first, second, and third ports 44, 45, 46. The rotary valve 51, with reference to FIGS. 6a and 6b, includes a hole 52 formed in the centre thereof through which the crankshaft 11 extends for rotatably coupling the valve 51 to the crankshaft 11. Referring to FIGS. 6 and 7, the rotary valve 51 further includes an arcuate inlet port 53 and an arcuate outlet port 54 axially and radially aligned to alternately register with the first, second, and third arcuate ports 44, 45, 46 of the valve seat 43 when the valve 51 is rotated by the crankshaft 11 The ports 53, 54 each cover an arc about the hole 52 of approximately 100° and are angularly spaced apart approximately 80° between ports.

As further shown in FIGS. 4 and 5, a mounting flange (or meter dome) 55 is secured to the top of the flow meter body 28. A supply chamber 56 is formed in the flange for supplying fluid to the inlet port 53 of the rotary valve 51. A supply port 57 formed in the flange provides fluid communication between the supply chamber 56 and fluid supply lines (not shown). Similarly, an annular discharge chamber 58 is formed in the flange 55 for receiving fluid discharged from the outlet port 54 of the rotary valve 51. A discharge port 59 provides fluid communication between the discharge chamber 58 and fluid discharge lines (not shown).

FIG. 7 further depicts one instantaneous position of the rotary valve ports 53, 54 (shown in phantom) superimposed over the first, second, and third ports 44, 45, 46 of the valve seat 43. In operation, the rotary valve 51 is rotated by the crankshaft 11 in a counter clockwise direction as indicated by the arrow 60. Accordingly, the inlet and outlet ports 53, 54 sequentially register with each of the ports 44, 45, 46. As shown in FIG. 7, the inlet port 53 is registered with the third port 46 and the outlet port 54 is registered with the second port 45. Registration of the inlet port 53 with the first port 44 is depicted as impending. Because each of the ports 44, 45, 46 cover an angle of approximately 80° and each of the rotary valve ports 53, 54 cover an angle of approximately 100°, each port 44, 45, 46 alternately registers with the inlet port 53 for 180° of rotation of the crankshaft 1 and then with the outlet port 54 for 180° of rotation. It can be appreciated that the inlet port 53 or the outlet port 54 may register with one or two, but not all three, of the ports 44, 45, 46 simultaneously. The ports 44, 45, 46 may, however, register with only one of the ports 53, 54 at a time.

To more fully illustrate the operation of the flow meter 27, and with reference to FIG. 4, it will be assumed that, initially, the flow meter body 28 is filled with fluid, the crankshaft 11 is rotated to place the first piston 3 in as close proximity to the head cover 30 as possible (i.e., a "top dead centre" position), the second piston 4 leads the first piston 3 by a phase angle of 60°, and the rotary valve ports 53, 54 are related to the first, second, and third ports 44, 45, 46 as shown in FIG. 7 a fluid, such as gasoline from an external source (not shown), is then supplied through the supply port 57 and passed through the supply chamber 56, the inlet port 53 of the rotary valve 51, and, in accordance with FIG. 7, through the third port 46. The fluid then flows through the third passageway 50 (FIG. 5) and into the crankcase chamber 42 where it applies pressure to displace the second piston 4 outwardly (away from the crankshaft 11). The first piston 3 resists outward movement since it is in a top dead centre position. The outward movement of the second piston 4 expels fluid from the second chamber 41 thereby causing the fluid to pass through the second passageway 49, the outlet port 54 of the rotary valve 51, the discharge chamber 58, and out through the discharge port to 59 to a discharge line (not shown). The movement of the second piston 4 also drives the crankshaft 11 via the second connecting rod 13. Accordingly, the crankshaft 11 imparts counter clockwise rotation to the rotary valve 51 and the inlet port 53 begins to register with the first port 44. Fluid in the supply chamber 48 then begins to flow through the inlet port 53 of the rotary valve 51 and through the first port 44. The fluid then flows through the first passageway 48 into the first chamber 40 and applies pressure to displace the first piston 3 inwardly (towards the crankshaft 11), thereby effecting further rotation of the crankshaft 11 and the rotary valve 51. The process continues according to the principles described herein. As a result, the pistons 3, 4 reciprocate in the cylinders 25, 26, respectively, thereby rotating the crankshaft 11, the attached rotary valve 51, and the magnetic wheel 32. The sensors in the Hall Effect transducer 33 detect the consequent fluctuation in the magnetic influence of the magnetic poles on the wheel 32 and generate a pulsed signal which is proportional to the flow rate of the fluid passing through the flow meter 27. Although not clear from the drawings, it is understood that the pulsed signal may be employed to drive an electronic counter and indicator for recording the volume and total value of fluid, such as gasoline, dispensed through the flow meter 27.

The inlet and outlet ports 53, 54 of the rotary valve 51 and the ports 44, 45, 46 cooperate such that the volume of fluid admitted to, or withdrawn from, the crankcase chamber 42 is equal to the algebraic sum of the volume respectively withdrawn from, or admitted to, the head end chambers 40, 41. Thus the crankcase chamber 42 provides what may be termed a "blind" or "hypothetical" piston and cylinder, mechanically and hydraulically cooperating with the pistons 3, 4 which are structurally existent. Thus the meter operates hydraulically and mechanically like a three piston meter or hydraulic motor although it only has the physical components of a two piston meter or motor. It should be noted that the flow into and out of the flow meter 27 is substantially constant. This constant flow results from reciprocating the axially-aligned pistons 3, 4 60° out of phase and from utilizing yokes 16, 17 as described above, which are substantially harmonic in conformity with Scotch Yokes.

Thus, as a result of all of the foregoing, the fluid meter of the present invention is compact, yet cost-efficient and mechanically efficient.

It is understood that the yoke slots of the invention, could have other shapes. The yokes could e.g. be curved to accomplish a perfect sine function movement or any modification of a periodic sine function.

Figure 8:
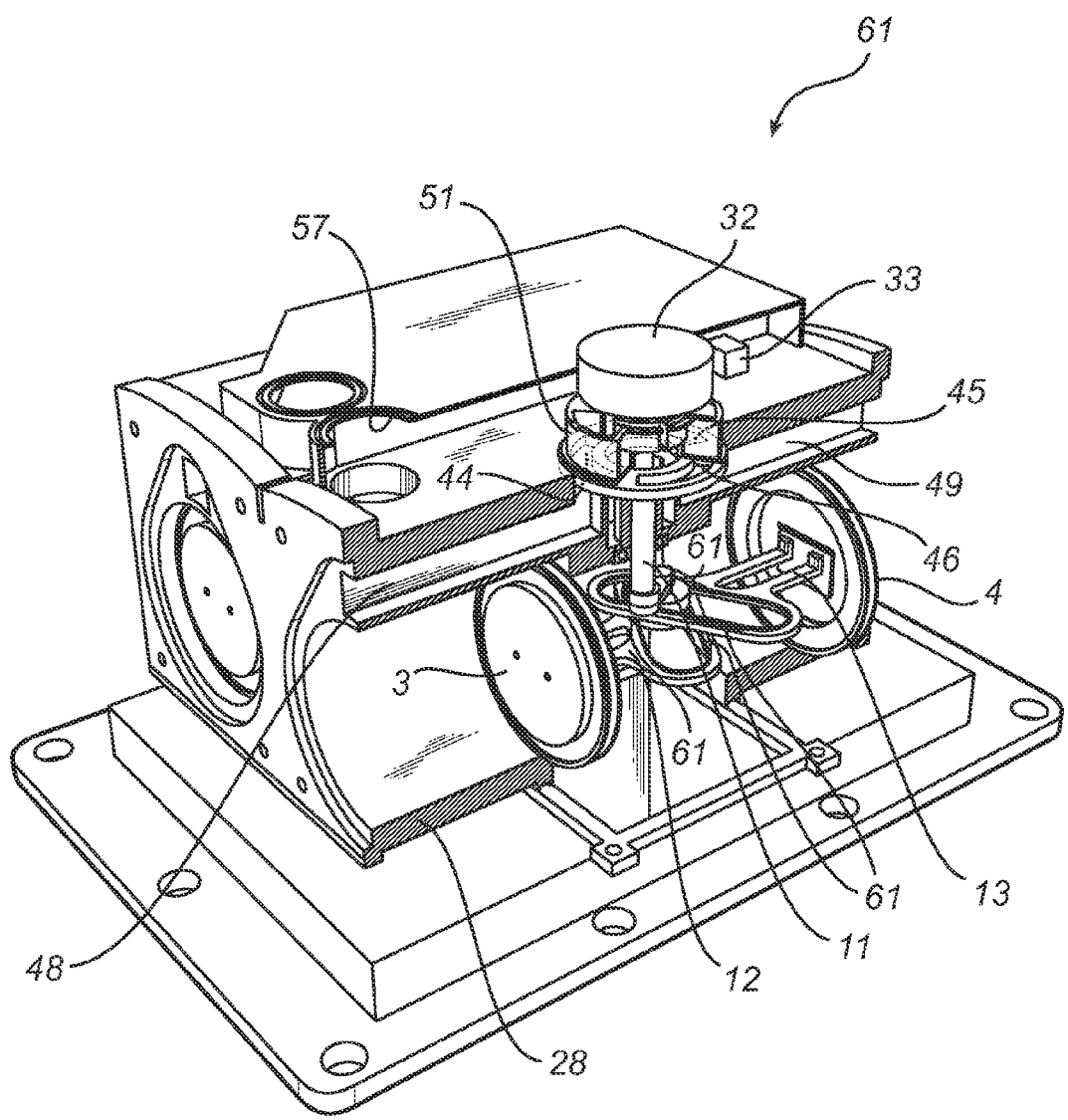
FIG. 8 is an isometric view of a unitary assembly incorporating two fluid meters similar to the meter of FIGS. 2a, 2b, 4 and 5.

It is further understood that multiple flow meters 27 may be integrated into a single assembly to gain several advantages over the single flow meter described hereinabove. For example, a duplex flow meter assembly 61 wherein two fluid meters 27, as depicted in FIG. 8, are integrated together would facilitate the construction of gasoline dispenser pump stations having two, four, six, or eight gasoline dispensers. Furthermore, a duplex flow meter 61 would only require a single meter body, meter dome, and end cover, thereby economizing on manufacturing costs. Installation of duplex flow meters 61 is facilitated as a result of simplified mounting and pipe work and the reduced cabinet size required to house a duplex fluid meter. Flexibility is also enhanced because a duplex flow meter could also serve a single hose outlet at twice the speed of delivery of a single unit flow meter.

It is further understood that the ports 44, 45, 46, 53, 54 may cover arcs of a number of different angles and, moreover, may have non-arcuate shapes.

It is still further understood that the supply port and the discharge port may instead be utilized as discharge and supply ports respectively. Furthermore, the supply and discharge lines connected thereto may be arranged for measuring the volume of any fluid that flows through any line. For example, in addition to measuring a fluid, such as gasoline that flows from a dispenser the meter could be used to measure the volume of water flowing from a pipe into a structure such as a residential house or other building.

It is understood that other variations in the present invention are contemplated and in some instances, some features of the invention can be employed without a corresponding use of other features. Accordingly, it is appropriate that the appended claims be construed broadly in a manner consistent with the scope of the invention.

The invention claimed is:

1. A fluid meter, comprising:
a housing defining at least one crankcase and at least two cylinders;
a crankshaft disposed in the crankcase;
at least two pistons respectively mounted in the cylinders for reciprocal movement,
a first connecting rod connected to one of the pistons and to the crankshaft for rotating the crankshaft in response to the movement of the one piston; and
a second connecting rod connected to the other piston and to the crankshaft for rotating the crankshaft in response to the movement of the other piston,
wherein the first and second connecting rods have yoke slots with a circumferential periphery for receiving a crank pin radially offset from the crankshaft, and
wherein said circumferential periphery of each one of said yoke slots has at least one resilient portion.

2. A fluid meter according to claim 1, wherein said at least one resilient portion comprises a recess in said circumference periphery of said yoke slot, wherein said recess being covered by a stripe which extends along at least a part of said circumference periphery of said yoke slot.

3. A fluid meter according to claim 1, wherein each one of said yoke slots has two resilient portions.

4. A fluid meter according to claim 1, wherein each one of said yoke slots has three resilient portions.

5. A fluid meter according to claim 1, wherein each one of said yoke slots has four resilient portions.

6. A fluid meter according to claim 1, wherein at least one of the connecting rods has a stopping member engaging the other connecting rod when the pistons are in a turning point for the crank case.

7. A fluid meter according to claim 6, wherein said stopping member is arranged to restrain the pistons from separating further away than the turning point for the crank case where the volume is at a maximum.

8. A fluid meter according to claim 6, wherein said stopping member is arranged to restrain the pistons from approaching further towards each other than the turning point for the crank case where the volume is at a minimum.

9. A fluid meter according claim 1, wherein said stripe is made of metal.

10. A fluid meter according to claim 1, wherein said resilient portion is provided in at least one position where the crank pin is located within the yoke slot when the corresponding piston is in a turning point for any of the cylinders or the crank case.

11. A fluid meter according to claim 1, wherein the connecting rods are connected to the crankshaft by one common crank pin that is radially offset from the crankshaft,
that an axis through the endpoints of the yoke slot of one connecting rod forms an angle alpha with the alignment axis of the two cylinders,
that an axis through the endpoints of the yoke slot of the other connecting rod forms another, different angle beta with said alignment axis, so that the corresponding pistons reciprocate out of phase.

12. A fluid meter according to claim 11, wherein each one of the yoke slots of said two connecting rods extends along a straight line between said endpoints, and said angles alpha and beta are chosen so that the pistons reciprocate approximately 60° out of phase.

13. A fluid meter according to claim 11, wherein alpha is approximately 60° and beta is approximately 120°.

14. A multiple fluid meter assembly, comprising:
at least two fluid meters comprising
- a housing defining at least one crankcase and at least two cylinders;
- a crankshaft disposed in the crankcase;
- at least two pistons respectively mounted in the cylinders for reciprocal movement;
- a first connecting rod connected to one of the pistons and to the crankshaft for rotating the crankshaft in response to the movement of the one piston; and
- a second connecting rod connected to the other piston and to the crankshaft for rotating the crankshaft in response to the movement of the other piston, wherein the first and second connecting rods have yoke slots with a circumferential periphery for receiving a crank pin radially offset from the crankshaft, and
wherein said circumferential periphery of each one of said yoke slots has at least one resilient portion.

15. A fuel dispensing unit for refuelling vehicles, comprising:
a fluid meter, comprising
- a housing defining at least one crankcase and at least two cylinders;
- a crankshaft disposed in the crankcase;
- at least two pistons respectively mounted in the cylinders for reciprocal movement,
- a first connecting rod connected to one of the pistons and to the crankshaft for rotating the crankshaft in response to the movement of the one piston; and
- a second connecting rod connected to the other piston and to the crankshaft for rotating the crankshaft in response to the movement of the other piston, wherein the first and second connecting rods have yoke slots with a circumferential periphery for receiving a crank pin radially offset from the crankshaft, and
wherein said circumferential periphery of each one of said yoke slots has at least one resilient portion.

\* \* \* \* \*